United States Patent Office.

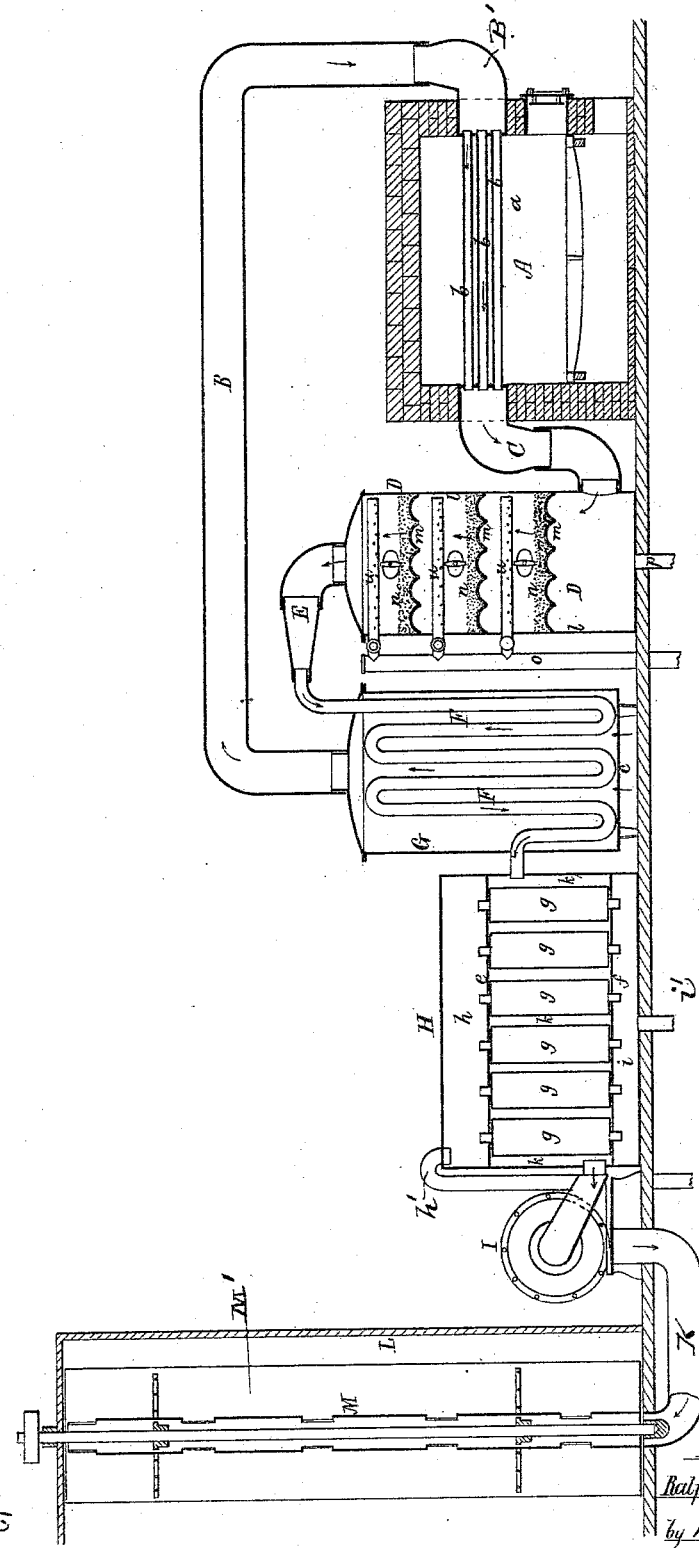

RALPH S. JENNINGS, OF BALTIMORE, MARYLAND.

APPARATUS FOR TREATING AIR TO BE USED FOR DRYING PURPOSES.

SPECIFICATION forming part of Letters Patent No. 303,163, dated August 5, 1884.

Application filed September 30, 1882. (No model.)

*To all whom it may concern:*

Be it known that I, RALPH S. JENNINGS, of the city and county of Baltimore, of the State of Maryland, have invented a new and useful Improvement in Apparatus for Treating Air to be Used for Drying Purposes; and I do hereby declare the same to be described in the following specification and represented in the accompanying drawing, of which—

The drawing is a longitudinal section of an apparatus embodying my improvements.

A represents a furnace for heating the air, it having a series of tubes, b, extending horizontally through the fire-chamber, which tubes at one end open into an inlet-pipe, B', and at the other end communicate with an educt, C. The pipe C opens into the lower part of the moisture-interceptor D, with the top of which a pipe, E, communicates, the latter leading to a cooling-duct, F. This duct may be a tubular coil, as shown, situated within a casing, G, the latter having apertures at the bottom for an inward passage of air from the outside. The pipe B, which carries air to the furnace, may communicate with the top of the cooler-casing G, as shown. The duct F communicates with a chamber, k, formed within a second casing, H. As shown, this casing has partitions e f, which provide three interior apartments, h i k, the latter between the two former. Into the chamber h a cooling agent, as, for instance, cold water, is delivered by any suitable duct, as at h', and this cooling agent is utilized to cool the air that passes through the chamber k.

g g are pipes communicating at the upper ends with chamber h, and at the lower with chamber i, they passing through the chamber k. The water passes downward from chamber h to chamber i, and can escape from the latter through a suitable educt, as at i'.

I represents a fan, shown as operating to exhaust the air by suction from chamber k, thereby inducing a forcible current through the above-described apparatus. The fan operates by blowing to drive the air through a duct, K, into the drying-room L. In order to distribute the air in the drying-room, the duct K delivers it to the hollow tube M around the shaft of the fan M'.

The moisture-interceptor D consists of a closed case, l, having across its interior a series of perforated partitions, each of which may be straight or formed with a series of arches, as shown. Upon each of these a bed or layer, n, of hydroscopic or moisture-absorbing material—such as quicklime, iron filings, &c.—is laid.

u u represent pipes, one being above each of the beds of the moisture-absorbing material, and delivering thereto (through perforations or otherwise) any liquid suitable for cleansing said material—that is to say, for removing the oxide of iron, when iron is used, &c.

The operation of an apparatus constructed and arranged substantially as shown is as follows: The air passes into the outer casing, G, and up around the duct F, it becoming partially warmed thereby, thence going through tube B and inlet N' to the tubes b in the furnace, where it is highly heated. The heating in the furnace may be carried to such a point that the moisture therein contained will be decomposed, it being well known that vapor of water at a temperature of 1,000° to 2,500° Fahrenheit, or thereabout, is decomposed into its constituent elements, the oxygen being withdrawn from the moisture to unite with the heated metal. After the heating the air passes through the moisture-interceptor, D, and the cooler or coolers, and is thereby brought back again to the required temperature. I do not wish to be limited, however, to the heating of the air in the manner above described, as under many circumstances an apparatus of substantially this character can be used to great advantage when the air is heated to a somewhat lower temperature, provided that the temperature of the hot surfaces be considerably higher than that of the air in the dry-room. I insure that every particle of it shall be thoroughly heated, and by the subsequent passing of it through the moisture-interceptor and the cooler or coolers it can be brought to exactly the temperature wanted, and with a guarantee that substantially every particle of the air is heated up to the necessary point; whereas, with the mechanisms heretofore employed, in which air has been driven across a furnace or through a heating apparatus and then taken directly to a dry-room, there has been upon the one hand the danger of having the air too highly heated, or, upon the other hand, the danger of having much of it below the necessary temperature.

By employing a cooler of substantially the character shown at G—that is to say, one in which an upwardly-rising current of air is used to cool a current of warm air—I attain the ends above referred to, and at the same time save the heat which is given off by the air coming from the furnace, this being taken up by the air going through the furnace. But I do not wish the invention to be limited to exactly this method of supplying the furnace with air, as that part of the operation can be varied more or less without any essential departure from the rest of the process.

Another important feature in this case is the employment of a supplemental cooler, as at $h$ $i$ $k$, adapted to effect the air by means of a liquid refrigerant after it has been more or less affected by the incoming current of normal air. During a large part of the year it is desirable to dry many of the articles which I successfully treat at a temperature but little if anything above the temperature of the normal air, and therefore while on one hand I can operate the devices very cheaply by using a current of said normal air for cooling more or less the heated air, yet, on the other hand, if reliance be placed upon the normal air alone, it would necessitate the employment of too great a space for this part of the device, and moreover, it would be practically impossible to bring the air to as low a temperature as is required.

I preserve the advantageous feature of cheapness, and at the same time accomplish an efficient cooling by supplementing the air-cooler with the cooler acting by means of a liquid refrigerant, as described. Of course, it will be understood that use could be made of a cooler employing the liquid refrigerant without the other, and when the normal temperature is low, (as in the winter,) this can be advantageously done, although under most circumstances it will be found that the expense of the furnace is much less if air be employed for part of the cooling work and said air be afterward carried to the furnace.

Instead of the moisture-interceptor shown, use may be made of one more or less modified.

I herein claim only the matter specifically set forth in the following claim, the distinguishing feature in this case being the supplemental cooler, and do not herein claim any of the features which are shown herein and are claimed in either of my other applications, respectively numbered 65,066, 86,026, 86,318, 86,319, 87,468, 87,469, 97,493, 98,699, 106,070, 103,414, 106,832, 121,265, and 121,424.

What I claim is—

In an apparatus for treating air to be delivered to a drying-room, the combination of the devices for heating the air, the duct which receives the air from the heating devices, and which is adapted to be surrounded by a current of air at the normal temperature for cooling it, and a supplemental cooler containing surfaces cooled by a liquid refrigerant, substantially as set forth.

RALPH S. JENNINGS.

Witnesses:
R. H. EDDY,
E. B. PRATT.